(12) United States Patent
Somanahalli Krishna Murthy et al.

(10) Patent No.: US 12,549,413 B2
(45) Date of Patent: Feb. 10, 2026

(54) SECONDARY CARRIER PREDICTION BASED ON UP-LINK CHANNEL IMPULSE RESPONSE

(71) Applicant: Telefonaktiebolaget LM Ericsson (publ), Stockholm (SE)

(72) Inventors: Prayag Gowgi Somanahalli Krishna Murthy, Mandya (IN); Vijaya Parampalli Yajnanarayana, Bangalore (IN); László Hévizi, Piliscsaba (HU)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 370 days.

(21) Appl. No.: 18/264,952

(22) PCT Filed: Feb. 15, 2022

(86) PCT No.: PCT/EP2022/053565
§ 371 (c)(1),
(2) Date: Aug. 10, 2023

(87) PCT Pub. No.: WO2022/179881
PCT Pub. Date: Sep. 1, 2022

(65) Prior Publication Data
US 2024/0137823 A1    Apr. 25, 2024
US 2024/0236782 A9    Jul. 11, 2024

(30) Foreign Application Priority Data
Feb. 27, 2021    (IN) .............................. 202141008350

(51) Int. Cl.
*H04L 25/02*    (2006.01)
*H04W 36/00*   (2009.01)
*H04W 36/30*   (2009.01)

(52) U.S. Cl.
CPC ...... *H04L 25/0204* (2013.01); *H04L 25/0212* (2013.01); *H04W 36/0083* (2013.01); *H04W 36/30* (2013.01); *H04W 36/302* (2023.05)

(58) Field of Classification Search
CPC ........... H04L 25/0204; H04L 25/0212; H04W 36/0083; H04W 36/30
See application file for complete search history.

(56) References Cited

U.S. PATENT DOCUMENTS

2022/0264484 A1* 8/2022 Chen .................. H04W 52/146
2023/0362741 A1* 11/2023 Li ..................... H04W 36/0016

FOREIGN PATENT DOCUMENTS

WO       2006068556 A1    6/2006
WO    WO-2022013093 A1 *  1/2022    ........ H04W 36/0064

OTHER PUBLICATIONS

International Search Report in PCT/EP2022/053565 mailed Jun. 24, 2022, 3 pages.
(Continued)

*Primary Examiner* — Joseph E Avellino
*Assistant Examiner* — Maryam Emadi
(74) *Attorney, Agent, or Firm* — Rothwell, Figg, Ernst & Manbeck, P.C.

(57) ABSTRACT

A computer-implemented method (1400) performed in a radio access network (1510) for secondary carrier prediction is provided. The method includes obtaining (1402) an uplink channel impulse response based on a reference signal transmitted by a user equipment (UE) (104) over a primary carrier link to a serving network node (102) in a primary cell (102) currently serving the UE (104). The method includes extracting (1404) one or more features from the uplink channel impulse response. The method includes predicting (1406) an existence or non-existence of a secondary carrier link between the UE (104) and a target network node in a secondary cell (106) based on the extracted one or more
(Continued)

features. The method includes determining (1408) whether to perform a handover procedure of the UE (104) from the serving network node in the primary cell (102) to the target network node in the secondary network cell (106) based on the predicting.

13 Claims, 16 Drawing Sheets

(56) References Cited

OTHER PUBLICATIONS

Kazemi, P., et al., "SNR prediction in cellular systems based on Channel Charting", 2020 IEEE Eighth International Conference on Communications and Networking (COMNET), Oct. 27, 2020, doi:10.1109/COMNET47917.2020.9306087, retrieved on Dec. 13, 2020, 8 pages.

Niitsso, A., et al., "A deep learning approach to position estimation from channel impulse responses," Sensors, vol. 19, No. 5, Mar. 2, 2019, doi:10.3390/s19051064, 24 pages.

Gowgi, P. and Yajnanarayana, V., "Uplink channel impulse response based secondary carrier prediction," 2021 National Conference on Communications (NCC), IEEE, Jul. 27, 2021, doi: 10.1109/NCC52529.2021.9530018, 6 pages.

Gowgi, P. et al., "Up-link channel impulse response based secondary carrier prediction," 2021 National Conference on Communications, 7 pages.

Feltrin, M., and Tomasin, S., "A machine-learning-based handover prediction for anticipatory techniques in Wi-Fi networks," 2018, IEEE, 5 pages.

Rydén, H., et al., "Predicting strongest cell on secondary carrier using primary carrier data," 2018 IEEE Wireless Communications and Networking Conference Workshops (WCNCW), 7th International Workshop on Self-Organizing Networks (IWSON), 6 pages.

Yajnanarayana, V., et al., "5G handover using reinforcement learning," 2020, IEEE 3rd 5G World Forum, 6 pages.

\* cited by examiner

SECONDARY CARRIER PREDICTION BASED ON UP-LINK CHANNEL IMPULSE RESPONSE

CROSS REFERENCE TO RELATED APPLICATION(S)

This application is a 35 U.S.C. § 371 National Stage of International Patent Application No. PCT/EP2022/053565, filed Feb. 15, 2022, which claims priority to India patent application Ser. No. 202141008350, filed Feb. 27, 2021, each of which is incorporated by this reference.

TECHNICAL FIELD

Disclosed are embodiments related to a machine learning approach towards secondary carrier prediction using up-link reference signals.

BACKGROUND

The handover (HO) of a user equipment (UE) is an integral part of a multi-cell wireless communication system. With large mobility of UEs, HO becomes a challenging task in dense deployments.

A simplified HO procedure signal flow is shown in FIG. 1. The HO procedure involves sequence of complex signaling between the serving cell (102), or primary cell, a target cell (106), and a UE (104). The UE (104) is currently being served by the primary cell (102). A typical RRC control message (1102) consists of list of parameters to be measured, reporting criteria, and reporting configuration. A UE periodically measures the signal on downlink (DL) from both serving and the target cell such as referenced symbols received power (RSRP) and the referenced symbols received quality (RSRQ), and whenever certain network configuration conditions are satisfied, the UE will send the latest measurement reports to the serving cell. These predefined network configuration conditions, called events, are set by the network through radio resource control configuration (RRC) messages. Some of the important events relevant to HO are A1-A5 where the event A1 is triggered when RSRP of the primary cell (PCell) is above certain threshold $\gamma>0$, event A2 is triggered when RSRP of PCell is below certain threshold, event A3 is triggered when RSRP of secondary cell (SCell) is above RSRP of PCell by an offset, event A4 is triggered when RSRP of SCell is above certain threshold, and event A5 is triggered when RSRPs of PCell is below a threshold $\gamma\_1>0$ and SCell is above a threshold $\gamma\_2>0$.

The UE periodically measures the RSRP or RSRQ of both the primary as well the target cell. Whenever certain network configuration conditions are satisfied, set by a RRC message from network, a measurement report (1104) is sent to the primary cell (102). The report is evaluated (1106), a HO request (1108) is sent to the target cell (106), an acknowledgement (1110) is sent from the target cell (106) to the primary cell (102), and then a HO command (1112) is sent to the UE (104). Upon establishing the link with target cell (1114, 1116), UE (104) will send connection complete message (1118). Each of the signaling between UE, the primary cells and the target cells are battery consuming, which should be avoided as much as possible A typical HO procedure with various events is shown in FIG. 2. FIG. 2 includes a RSRP of both PCell (i.e. primary or serving cell) and SCell (i.e. target cell) plotted against time. Event A1 (202) is triggered when RSRP of the primary cell (PCell) is above certain threshold $\gamma>0$. Event A2 (204) is triggered when RSRP of PC is below certain threshold. Event A3 (208) is triggered when RSRP of secondary cell (SCell) is above RSRP of PC by an offset. Event A4 (206) is triggered when RSRP of SC is above certain threshold, and event A5 (210) is triggered when RSRPs of PC is below a threshold $\gamma\_1>0$ and SCell is above a threshold $\gamma\_2>0$. The HO is triggered at the UE when the event A5 (210) holds true for certain period of time called time-to-trigger (TTT), which makes the current approach reactive to the events.

SUMMARY

As described above, a typical handover problem requires a sequence of complex signaling between a UE, the serving base station, and a target base station. Some of the signaling carries measurements to the serving base station, and the measurements are used to make a decision on handover. The measurements, however, are computationally intensive, and can potentially drain the UE battery. Moreover, future networks may be densely deployed with multiple frequency layers, rendering current handover mechanisms sub-optimal because they cause the battery to drain fast.

With the advancement of telecommunication technology such as 5G and beyond, densification of networks and systems operating in multiple frequency bands is a natural consequence. Leveraging the current approaches concerning mobility of UEs, in particular the inter-frequency handover problems, to the new technology without any changes in the way in how inter-frequency handover is handled will put a tremendous overhead on the system. This could lead to complex transceiver design of the UE, changes in RRC configurations, and the most important of all is the energy consumption. A clever way to look at this problem is to apply artificial intelligence (AI) and machine learning (ML) algorithms that are completely data driven and they come with inherent non-linearity.

According to some embodiments, a machine learning (ML) based approach towards secondary carrier prediction (inter-frequency handover) is proposed using the up-link reference signals. Some advantages of this ML approach include, for example: the HO decision does not require inter-frequency measurements or reporting of the measurements back to the serving cell, the ML approach simplifies the HO signal flow and greatly reduces the energy requirement by the UE, and the ML approach simplifies the transceiver design of the UE. In addition, these advantages can be realized with little or no modification to the existing standards because the ML approach utilizes the existing UL reference signals that are typically available at the 5G antenna systems for beamforming decisions for making HO decisions. Accordingly, the approaches disclosed herein would require no or minimal changes in the system resulting in easy deployment of the solution. In addition, the approaches disclosed herein utilize the information already available within the system for beam forming decisions and hence there is no additional overhead on the system.

According to one aspect, a computer-implemented method performed in a radio access network for secondary carrier prediction is provided. The method includes obtaining an uplink channel impulse response based on a reference signal transmitted by a user equipment (UE) over a primary carrier link to a serving network node in a primary cell currently serving the UE. The method includes extracting one or more features from the uplink channel impulse response. The method includes predicting an existence or non-existence of a secondary carrier link between the UE and a target network node in a secondary cell based on the extracted one or more features. The method includes determining whether to perform a handover procedure of the UE from the serving network node in the primary cell to the target network node in the secondary network cell based on the predicting.

In some embodiments, the method is performed by the serving network node in the primary cell currently serving the UE.

In some embodiments, the predicting comprises performing a binary classification using a machine learning process. In some embodiments, the performing the binary classification comprises: setting a first classification indicating the existence of the secondary carrier link if $G(x_{f_s}) \geq \alpha$; and setting a second classification indicating the non-existence of the secondary carrier link if $G(x_{f_s}) < \alpha$, wherein $x_{f_s}$ is the extracted one or more features, $x_{f_s} \in R^d$, $G:R^d \rightarrow R$, and $\alpha$ is a predefined threshold greater than zero. In some embodiments, the method includes training the machine learning process, wherein the training comprises: collecting an uplink channel impulse response between a transmitter moving within a predefined geographic region and an antenna array, recording, at each location of the moving transmitter within the predefined geographic region, a plurality of channel measurements based on the uplink channel impulse response, and identifying an existence of a target network node in a respective secondary cell at each of a plurality of secondary cell locations within the predefined geographic region. In some embodiments, the plurality of channel measurements comprise at least one of: real parts of estimated channel matrices, imaginary parts of estimated channel matrices, and a signal to noise ratio measured at each antenna during channel estimation. In some embodiments, the method includes training the machine learning process, wherein the training comprises: identifying a deployment in a geographic region with a standard propagation environment and having a plurality of primary network nodes and a plurality of secondary target network nodes, for a given carrier frequency, collecting an uplink channel impulse response from a transmitter at a location for all links above a predefined threshold, and classifying the location of the transmitter as having a secondary link between the transmitter and a secondary target network node based on a strength of the secondary link measured from the uplink channel impulse response.

In some embodiments, the extracted one or more features from the uplink channel impulse response comprise one or more of: energy, minimum value, maximum value, distance of a nearest target network node from the serving network node, Cartesian coordinates of the serving network node, and Cartesian coordinates of the nearest network node.

According to optional embodiments, in addition to minimum and maximum energy values, the minimum and maximum values may for example refer to minimum or maximum RSRP values.

In some embodiments, the reference signal is an orthogonal frequency-division multiplexing (OFDM) pilot.

In some embodiments, the method includes determining that the UE has an uplink link gain above a predetermined threshold; and in response to the determining, recording the uplink channel impulse response at the serving network node in the primary cell.

In some embodiments, the method includes initiating a handover procedure of the UE from the serving network node in the primary cell to the target network node in the secondary network cell based on the predicting.

According to another aspect, a serving network node in a primary cell is provided. The serving network node is adapted to perform any one of methods described above.

In another aspect, a computer program is provided. The computer program includes instructions which when executed by processing circuitry causes the processing circuitry to perform the method of any one of the methods described above.

In yet another aspect, a carrier containing the computer program is provided, wherein the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

In V. Yajnanarayana, H. Ryden and L. Havezi "5G Handover using Reinforcement Learning", 2020 IEEE 3rd 5G World Forum (5GWF'20), April 2020, pp. 349-354 DOI: 10.1109/5GWF49715.2020.9221072, a reinforcement learning based approach for HO control problem was proposed using UE measurement-report to maximize a long-term utility. The approach uses average link-beam gain as utility for different propagation environment and mobility pattern, but does not address the inter-frequency HO problem. In H. Ryden, J. Berglund, M. lsaksson, R. Coster and F. Gunnarsson, "Predicting strongest cell on secondary carrier using primary carrier data", 2018 IEEE Wireless Communications and Networking Conference Workshops (WCNCW), Barcelona, 2018, pp. 137-142, a ML based approach for handling inter-frequency HO problem was proposed. The goal of this approach was to predict the strongest cell on the secondary carrier based on primary carrier data. In this approach, a ML algorithm placed in the primary carrier cell was trained to predict the strongest secondary carrier cell based on one or more of the following features: 1) RSRP of the serving and up to eight neighboring cells 2) precoder matrix indicator 3) timing advance (TA). In this approach, the features considered are based on DL based-measurements by the UE, and accordingly, the UE still has to do DL-measurements and report them to the BS, resulting in excessive battery drain. Similar to above referred to "Predicting strongest cell on secondary carrier using primary carrier data", M. Feltrin and S. Tomasin, "A machine-learning-based handover prediction for anticipatory techniques in Wi-Fi networks," in 2018 Tenth Int. Conf. on Ubiquitous and Future Netw. (ICUFN), 2018, pp. 341-345, proposed a neural network (NN) based approach to anticipate the HO and blind spots over a Wi-Fi network. In this approach NN considers the past M samples of received signal strength indicator (RSSI) and predicts HO and blind spots for the UE. But RSSI is measured at the UE, thereby leading to faster battery draining of the UE.

According to some embodiments, a PCell currently serving a UE is equipped with an ML algorithm to make HO decision on the inter-frequency HO of the UE. The input for the ML algorithm includes relevant features extracted from the UL channel impulse response to the PCell. Upon completion of training of the ML algorithm, the existence or the non-existence of the SCell link is predicted by the ML algorithm at the PCell.

Figure 1:
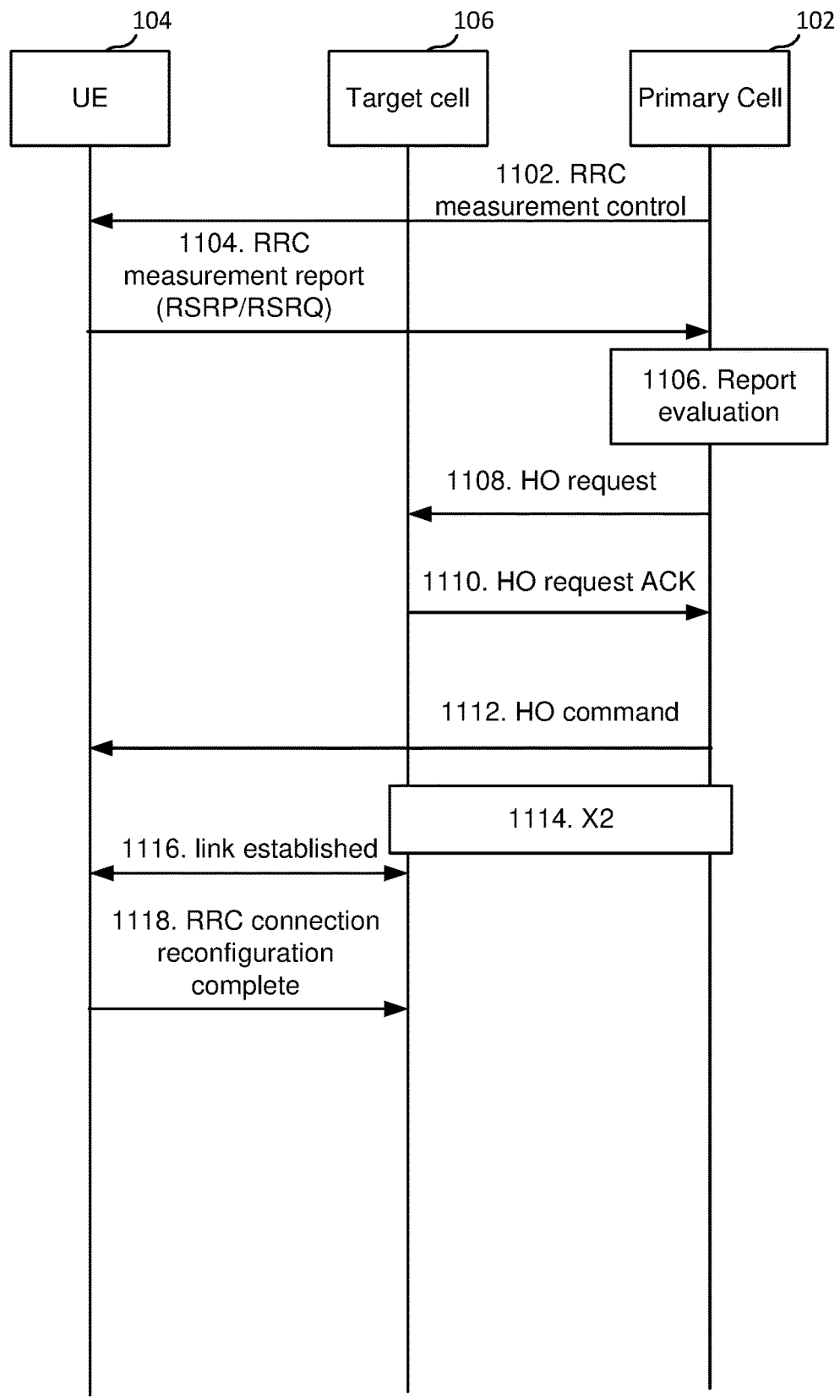
FIG. 1 illustrates a signal flow according to an embodiment.
Figure 2:
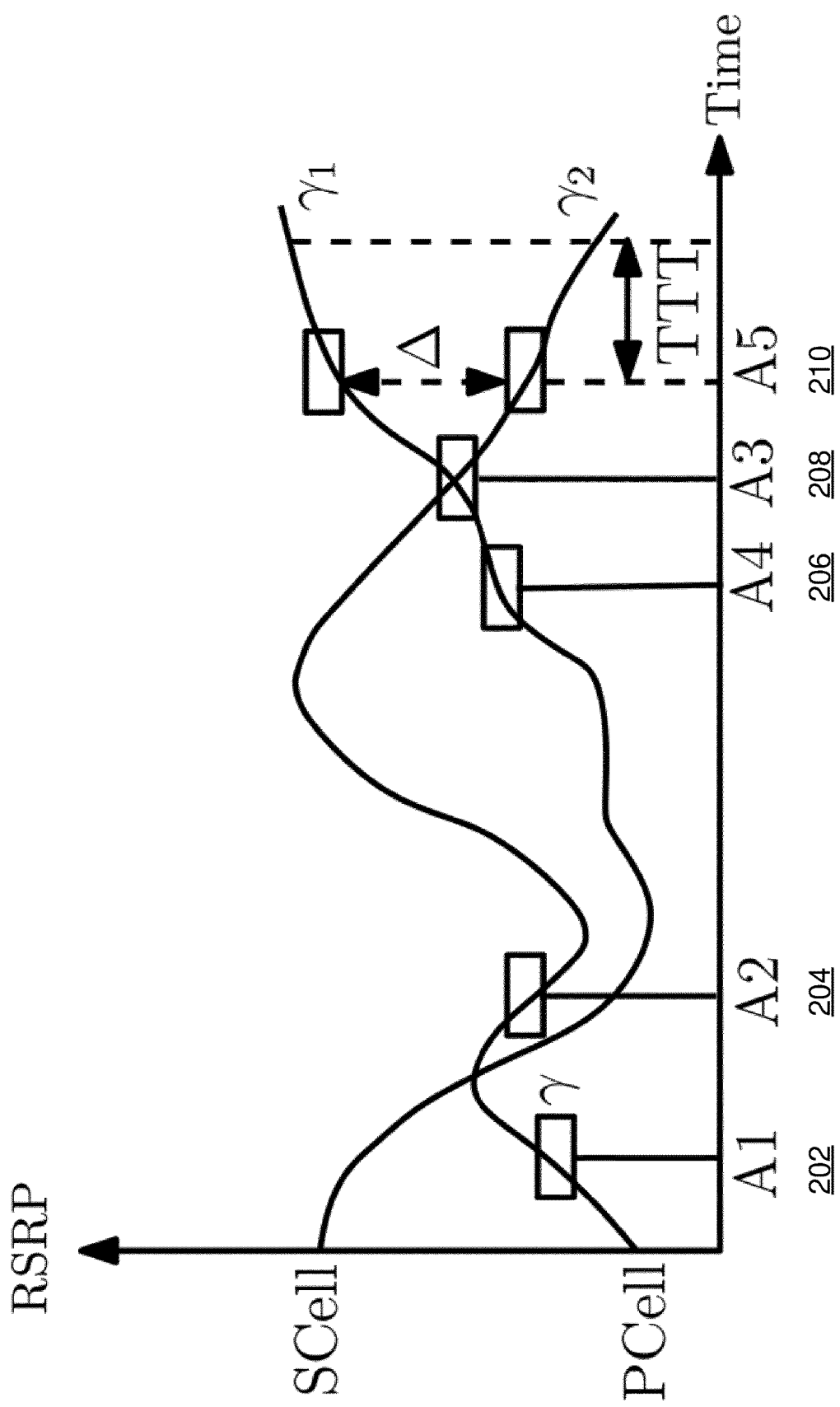
FIG. 2 illustrates a handover procedure with various events according to an embodiment.
Figure 3:
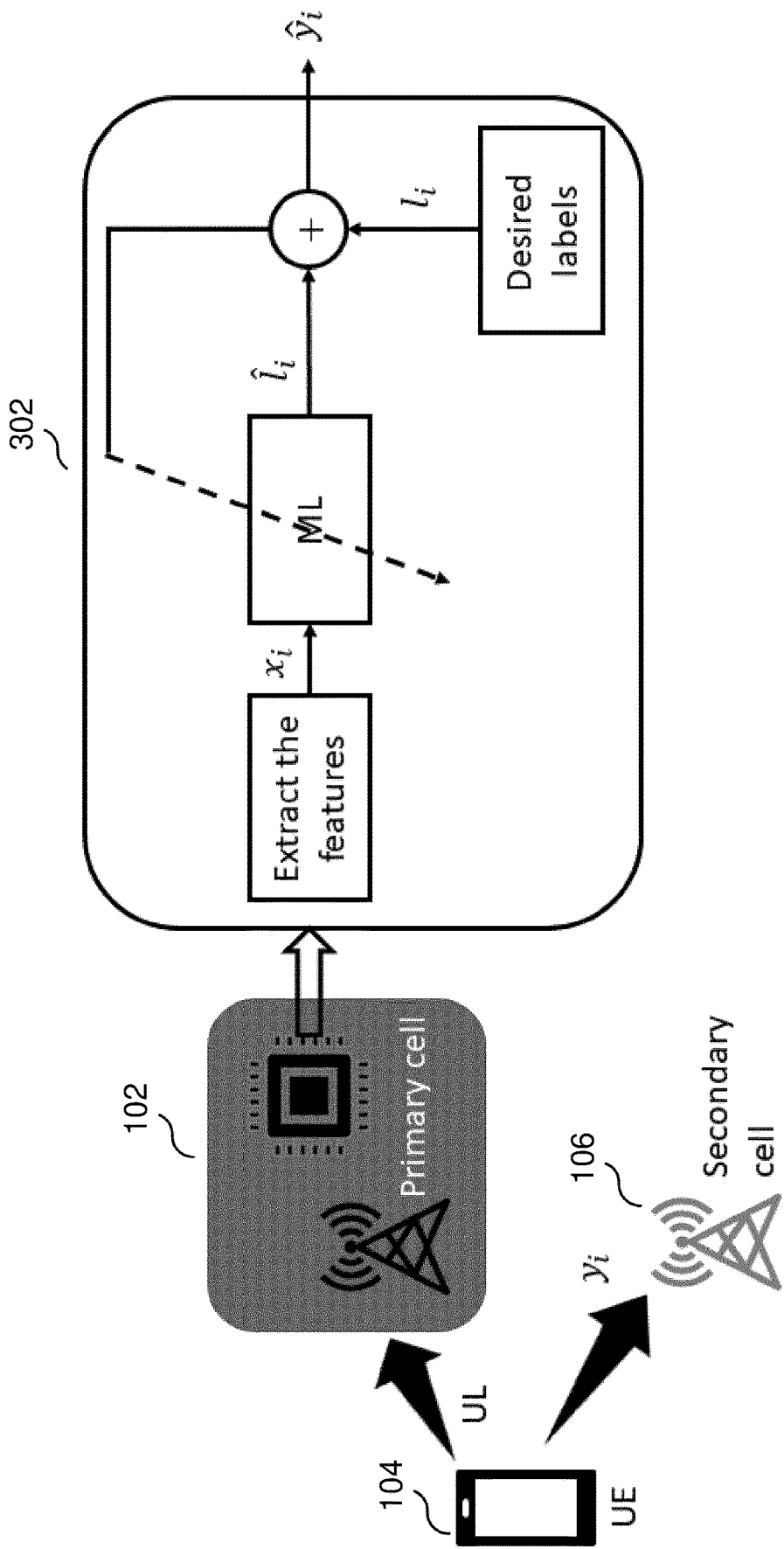
FIG. 3 illustrates a system, according to some embodiments.

FIG. 3 illustrates a system (300), according to some embodiments. For simplicity, FIG. 3 illustrates a single UE (104), PCell (102), and SCell (106). The UE (104) is currently being served by the PCell (102) and the 5G antenna system at the PCell (102) base station is equipped with a ML algorithm (302). In 5G and beyond systems the UL-impulse response is available at the BS, e.g., for use for beam-forming decisions. The ML algorithm of the PCell (102) base station predicts the existence or non-existence of secondary carrier link for the UE (104). The existence or non-existence of a link is based on the signal strength of the secondary carrier. A threshold is predefined, and the existence of the secondary carrier is considered if the signal strength is above this threshold. Accordingly, the HO can be framed as a binary hypothesis problem where the output label "0" indicates "null" hypothesis (no secondary carrier detected) and "1" indicates the alternative hypothesis (presence of secondary carrier). The ground truth for training the ML algorithm may be obtained by actual measurements.

Figure 4:
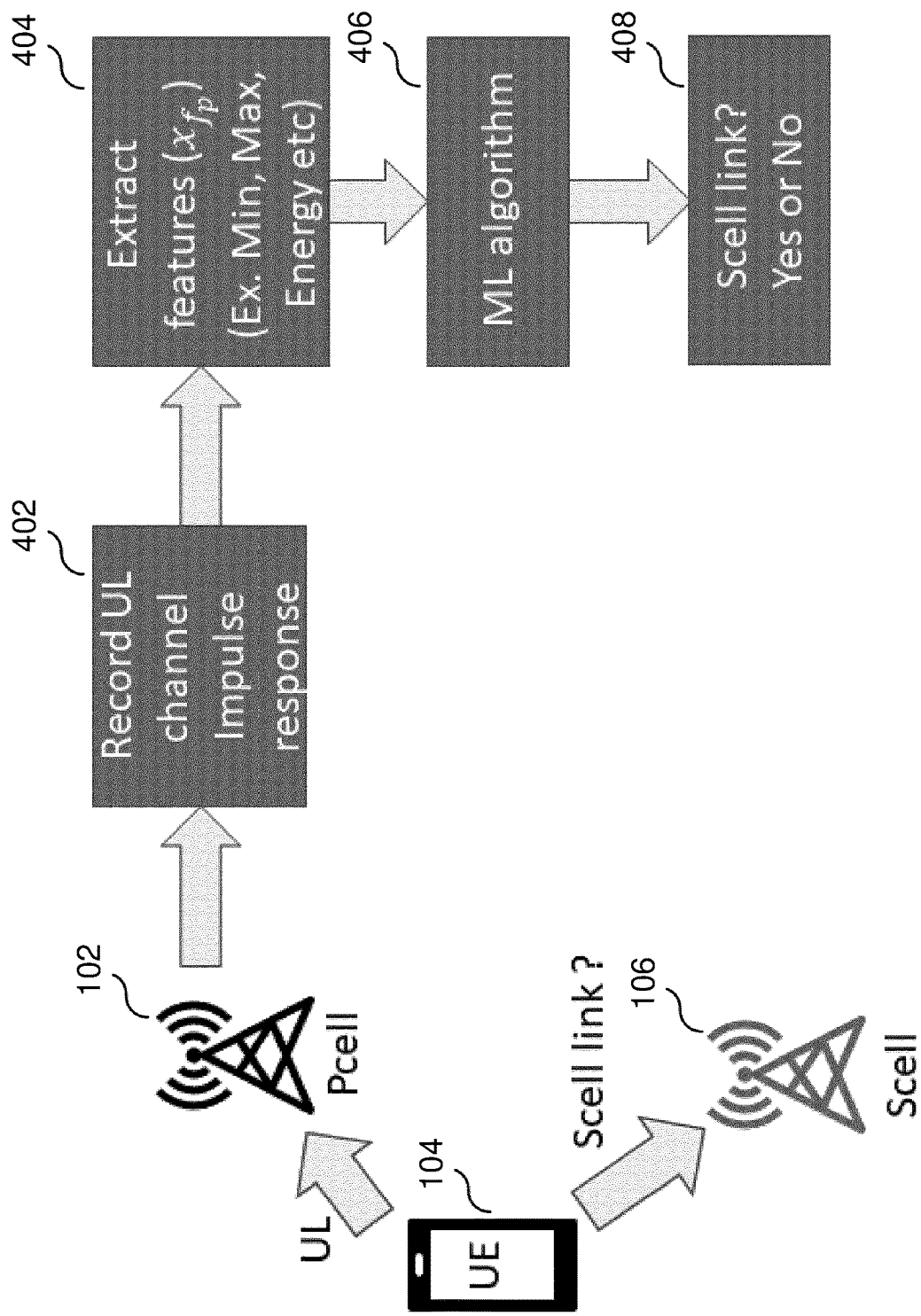
FIG. 4 illustrates a flow, according to some embodiments.

FIG. 4 illustrates a flow (400), according to some embodiments. A user equipment (UE) (104) is currently being served by a primary cell (PCell) (102). At 402, a network node in the PCell (102) records the up-link (UL) channel impulse response (CIR) for the UE (102). At (404), certain features ($x_{f_s}$) are derived from the CIR forming the data set along with labels obtained from ground truth measurements. At 406, a machine learning algorithm (ML) is trained with the data set and for any UE with its ($x_{f_p}$) given as an input to the trained ML algorithm, the existence or the non-existence of the secondary cell (SCell) (106) carrier link is predicted. Below two exemplary embodiments of experimental Setup and Training of ML Algorithm/Process according to the present disclosure are disclosed in detail.

Figure 5:
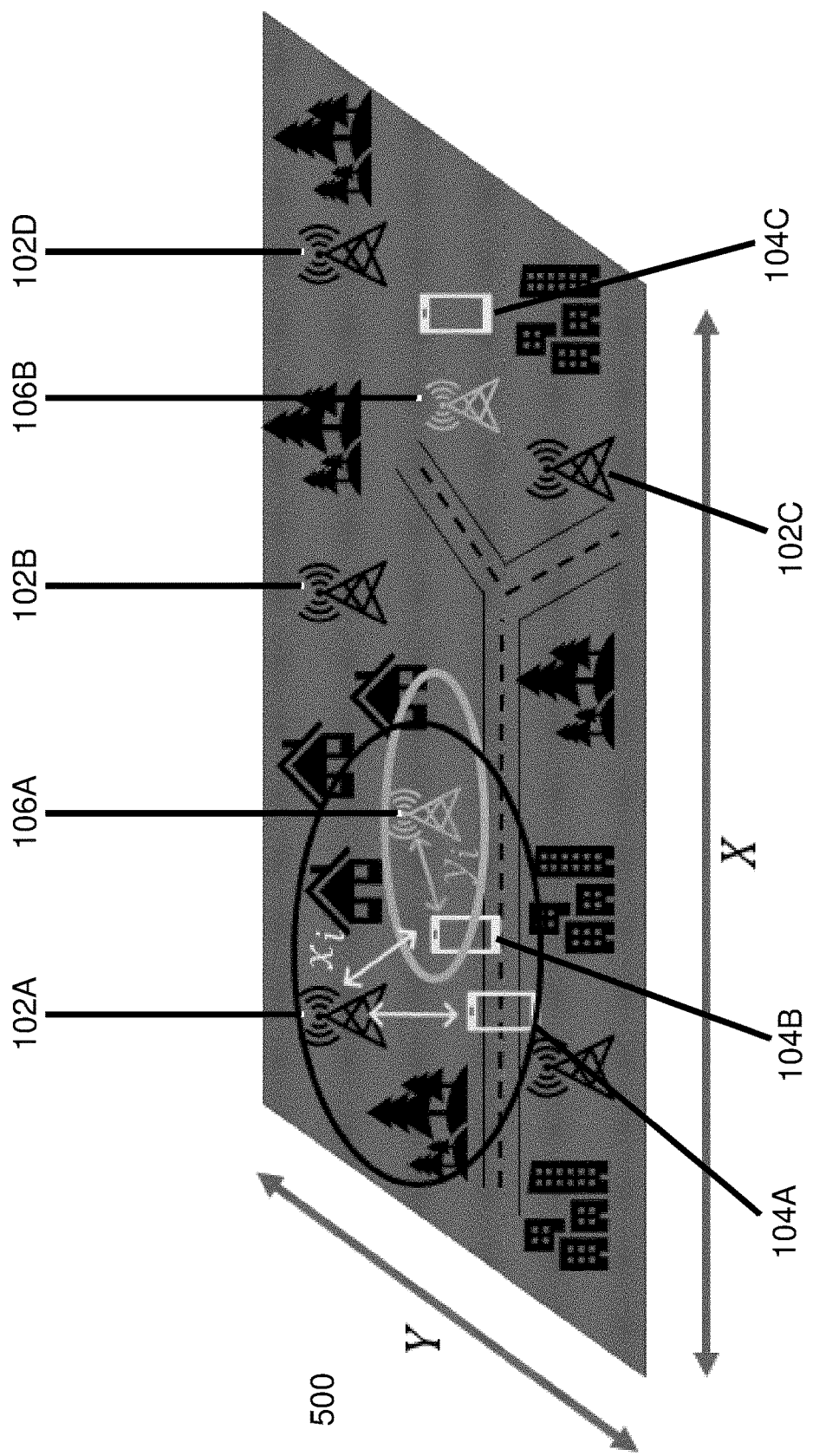
FIG. 5 illustrates a bounded geographic region, according to some embodiments

FIG. 5 illustrates a bounded geographic region, according to some embodiments. The bounded geographic region (500) X, Y∈ [a×b]×[c×d], where a, b, c, d∈ R. The bounded geographical region (500) contains a plurality of UEs (e.g., 104A-C), PCells (102A-D), and SCells (106A-C) as shown in FIG. 4. PCell is operating at a carrier frequency $f_p$ and SCell is operating at a carrier frequency of $f_s$. In some examples, $f_p \in FR_1$ and $f_s \in FR_2$ ($FR_1$: 410-7125 MHz and $FR_2$: 24250-52600 MHz), however, it is possible that both $f_p$, $f_s \in FR_1$. For every UE whose UL link gain at PCell above a particular threshold, the UL channel impulse response is recorded at a network node in the PCell and certain features are extracted ($x_{f_s}$). For every such UE, label y=1 if $G(x_{f_s})$ a and 0 otherwise where $G: R^d \to R$ and $\alpha > 0$:

$$y = \begin{cases} 1, & \text{if } G(x_{f_s}) \geq \alpha \\ 0, & \text{otherwise} \end{cases}$$

The set of all ($x_i$, $y_i$) forms the data set. The label of "1" indicates a prediction of an existence of a secondary carrier, the label "0" indicates the non-existence of the secondary carrier.

According to a first exemplary embodiment:

In one example, a data-set D1 is collected from a real world deployment using massive MIMO channel sounder. The dataset was originally conceived for UE positioning using UL-channel impulse response, and the same dataset was used for the secondary carrier prediction. This dataset consists of an UL channel impulse response between a moving transmitter and an 8×8 antenna array (horizontally polarized patch antennas).

Figure 6:
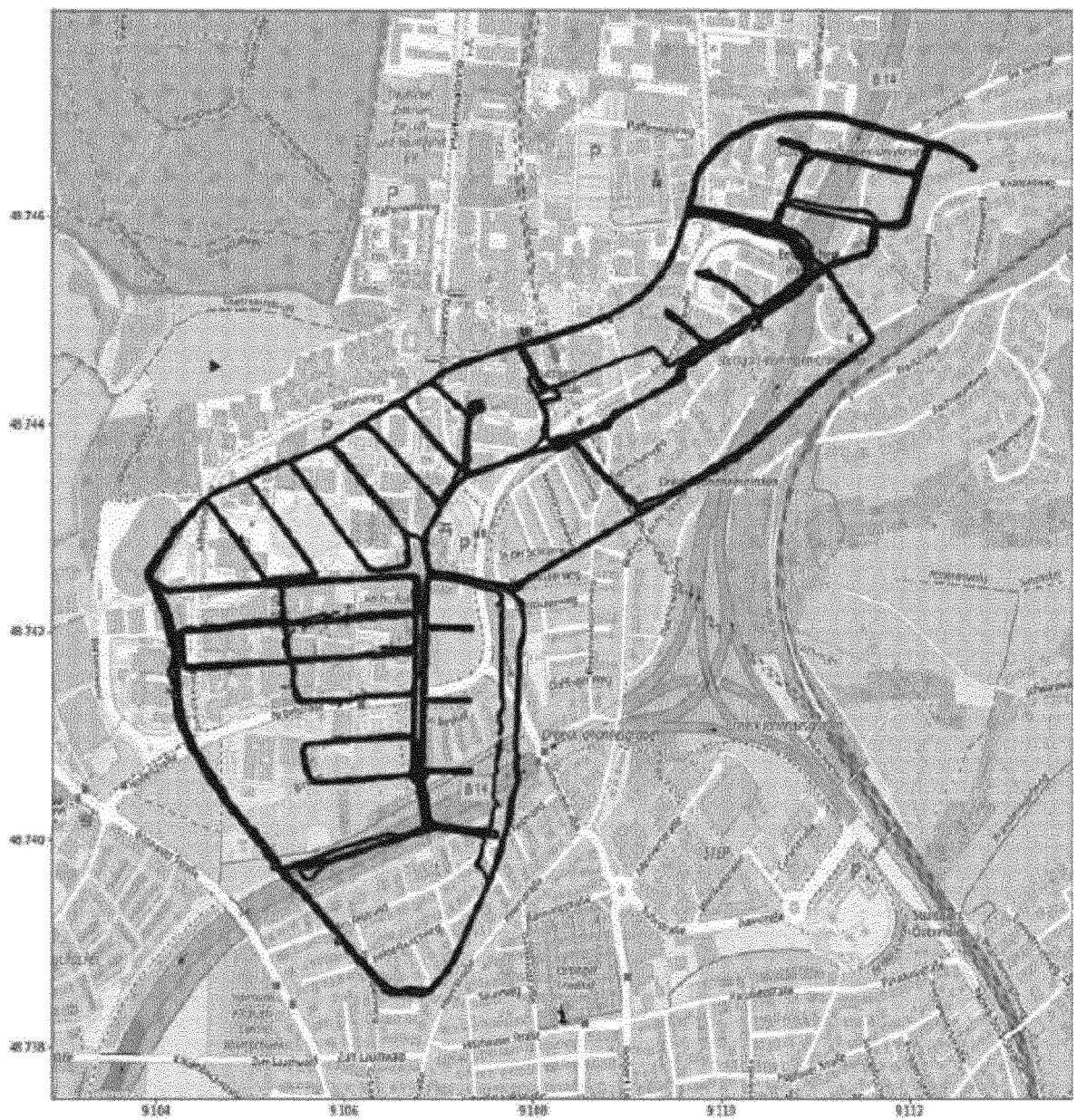
FIG. 6 illustrates a path traversed by a moving vehicle with a transmitter, according to some embodiments.

FIG. 6 illustrates a path traversed by a moving vehicle with a transmitter, according to some embodiments. In this example, the transmitter was moved around a residential area and transmitted UL orthogonal frequency-division multiplexing (OFDM) pilots with a bandwidth of 20 MHz and 1024 sub-carriers at a carrier frequency of 1.27 GHz. Ten percent of the subcarriers were used as guard bands, leaving 924 usable subcarriers. At the receiver 8 of the 64 antennas were perpetually malfunctioning, and hence, only 56 antennas provided useful measurements. For every location, 5 channel measurements were recorded. FIGS. 5 and 6 show the location of the transmitter in a local Cartesian coordinate system with the receiver placed at the origin on the XY-plane.

Figure 7:
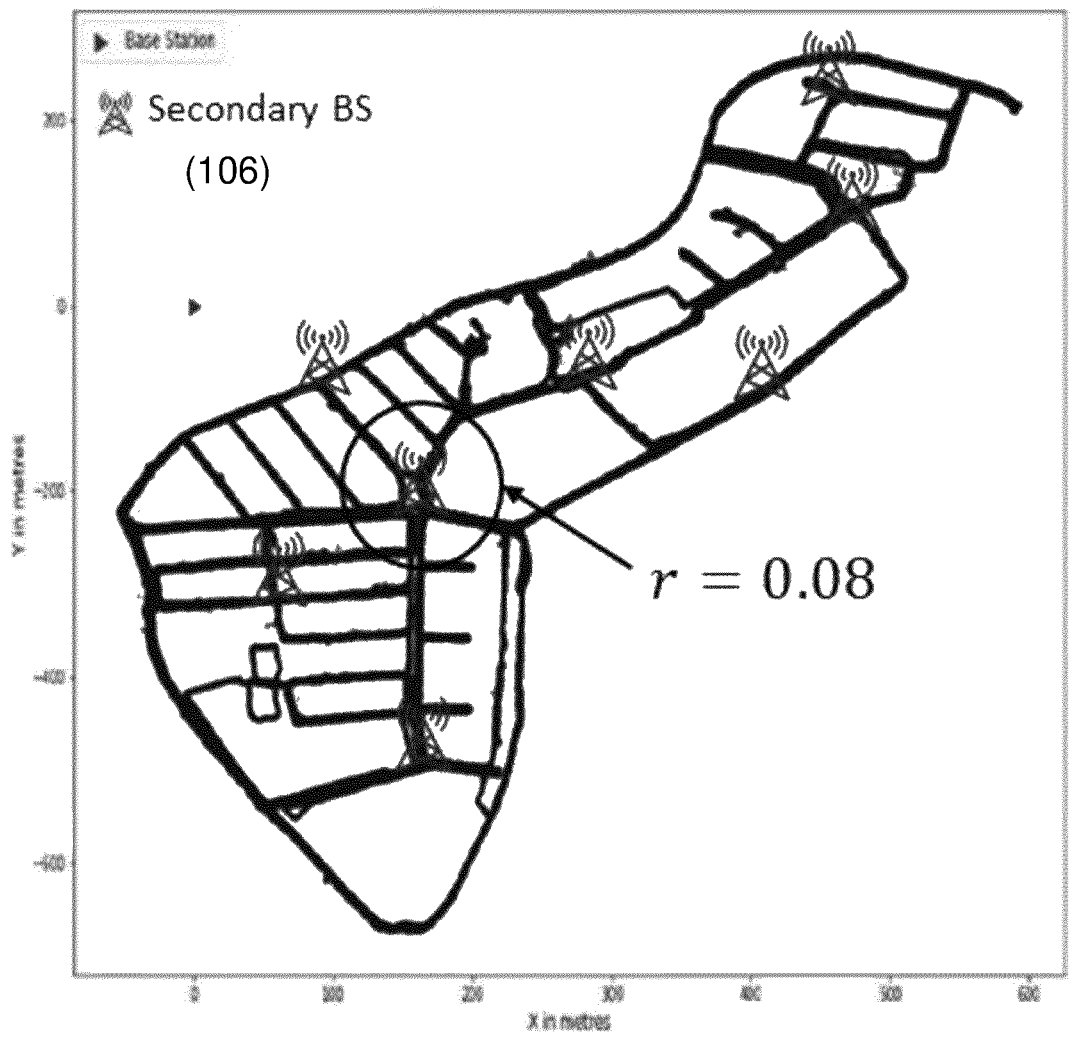
FIG. 7 illustrates the addition of new secondary network nodes in combination with a path traversed by a moving vehicle with a transmitter, according to some embodiments.

The UL channel measurement contains real and imaginary parts of the estimated channel matrices and the signal to noise ratio (SNR) measured at each antenna during channel estimation. The channel matrix is imaginary because, a wireless link will act on the transmitted signal in both amplitude and phase, which, when represented in Cartesian, will have both real and imaginary parts. Therefore, MIMO channel matrix which defines the channel between each tx-rx pair is imaginary. The binary estimated signal denoting the existence or non-existence of the secondary carrier serve as the labels. These labels are artificially created as follows: the existence of secondary cells at few locations, as shown in FIG. 7, are assumed. FIG. 7 illustrates the addition of new secondary network nodes in combination with a path traversed by a moving vehicle with a transmitter, according to some embodiments. The existence of a few secondary network nodes, or base stations (BSs) are assumed at the few junction points shown in FIG. 7.

In typical deployments, the secondary carriers are used to provide high speed connectivity in dense hot-spot regions. In the shown street maps, of FIG. 7, these hot-spots could arise in the street intersections. Locations within a circle of radius r=0.08 (after normalization of X and Y coordinates i.e., X, Y∈[−1,1]×[−1,1]), and centered around secondary BSs to have a link to the secondary carrier and label them as "1", were considered. The rest of the locations are labeled as "0."

Figure 8:
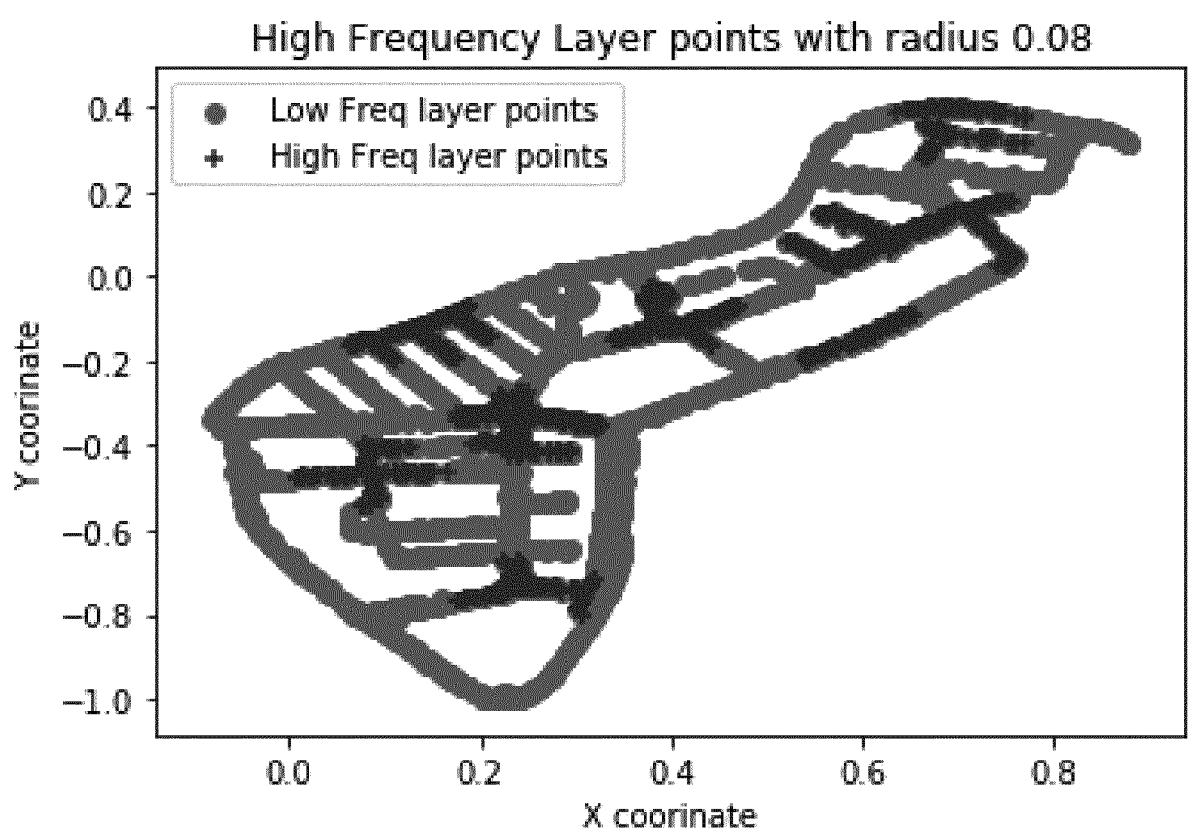
FIG. 8 illustrates label generation, according to some embodiments.

FIG. 8 depicts label generation, according to some embodiments. All the UEs within a circle of radius equal to 0.08 are considered to have a link with the newly added BSs, and are labeled as "1" (dark gray, +), otherwise as "0" (light gray, *). As shown in FIG. 8, there are dark gay (label=1) and light gray (label=0) shaded points, i.e., the label $l_i$, for the BS $b_j$ at location $q_i$ is 1 if $\|q_i-b_j\|_2 \leq 0.08$, otherwise 0 and $\|\cdot\|_2$ is the usual Euclidean norm.

According to a second exemplary embodiment:

In a second example, there is a setup where a large city deployment with standard defined propagation environment is used to generate two data sets D2 and D3. For D2 both $f_p$ and $f_s$ are in $FR_1$ and for D3, $f_p \in FR_1$ and $f_s \in FR_2$. 1000 UEs and 80 BSs, $f_p$=0.9 GHz, and $f_s$=2 GHz respectively (data set D2) were considered. Similarly, 100000 UEs and 95 BSs with $f_p$=3.5 GHz and $f_s$=28 GHz respectively (data set D3) were considered.

The data set in both the deployments are generated as follows: for a given carrier frequency $f_p$, the UL channel response for all the links above certain threshold was captured and for the same position labels are attached based on strength of the secondary carrier link.

Figure 9:
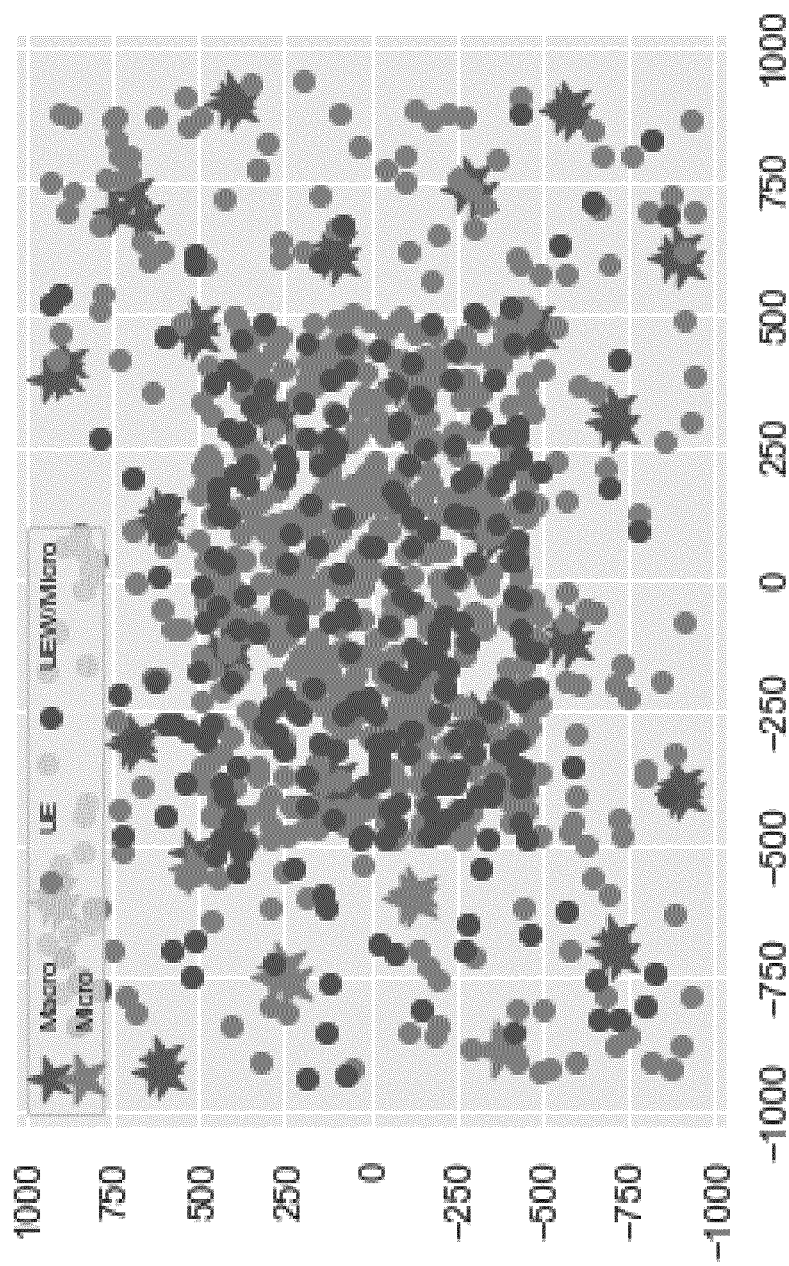
FIG. 9 illustrates a deployment scenario, according to some embodiments.

FIG. 9 illustrates a deployment scenario, according to some embodiments. FIG. 9 illustrates a deployment of micro and macro cells in a city located in Asia.

Figure 10:
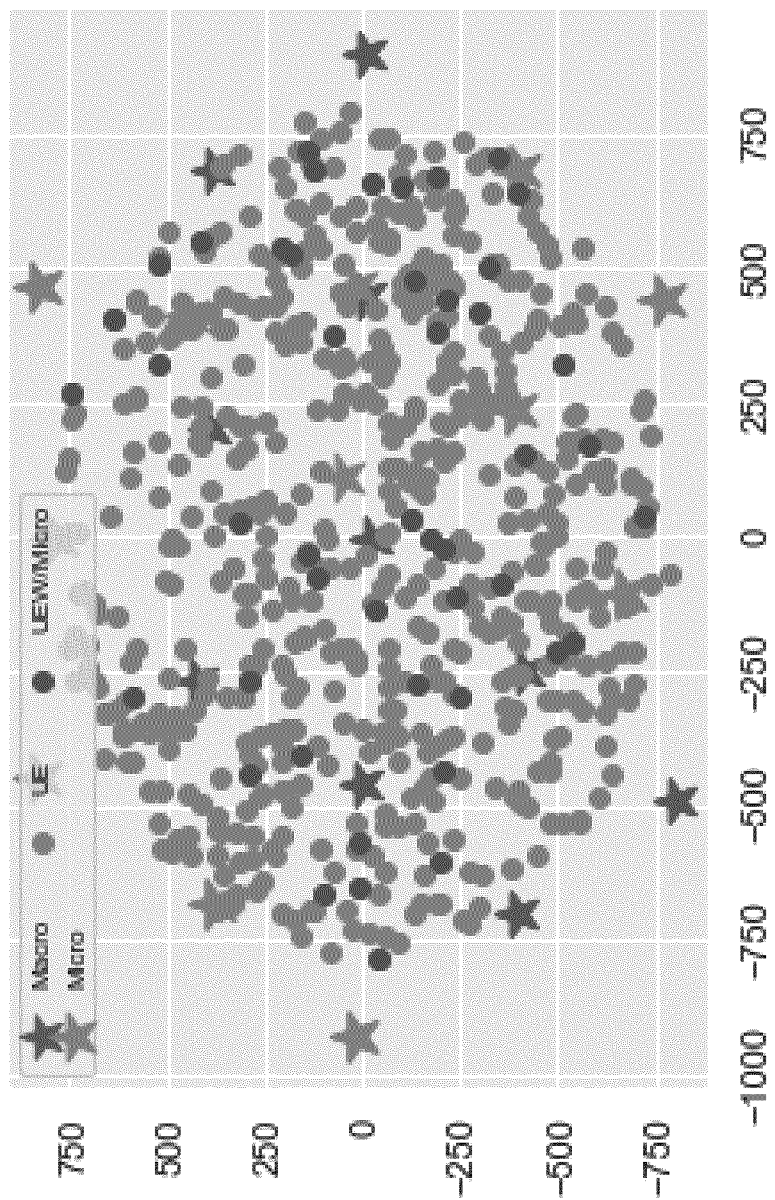
FIG. 10 illustrates a deployment scenario, according to some embodiments.

FIG. 10 illustrates a deployment scenario, according to some embodiments. FIG. 10 illustrates a deployment of micro and macro cells in London.

In each of the FIGS. 9-10, light gray points are the UEs having label "0", dark gray points are the UEs having label "1", dark gray stars are macro BSs, and light gray stars are the micro BSs. From the described scenarios, a data set (x, y) is generated as follows: For every UE whose UL link gain is above a threshold, its UL impulse response is recorded at the PCell base station and certain features are extracted ($x_{f_s}$) and for every such UE, label y=1 if $G(x_{f_s}) \geq \alpha$ and 0 otherwise where $G:R^d \rightarrow R$ and $\alpha>0$.

The performance of the binary classification experiment using random forest algorithm with balanced input data set was analyzed using receiving operating characteristic curve (ROC). The ROC curve was obtained by plotting the true positive rate (TPR) against false positive rate (FPR) by varying classification threshold of a binary classifier, and the performance was quantified using area under receiving operating characteristic curve (AUROC). The diagonal line in the ROC plot indicates random guessing similar to tossing of a fair coin experiment and has an area equal to 0.5, whereas a perfect classifier has an area equal to one. For each experiment six-fold cross validation (CV) was performed and plotted ROC for each of the CV data sets.

Figure 11:
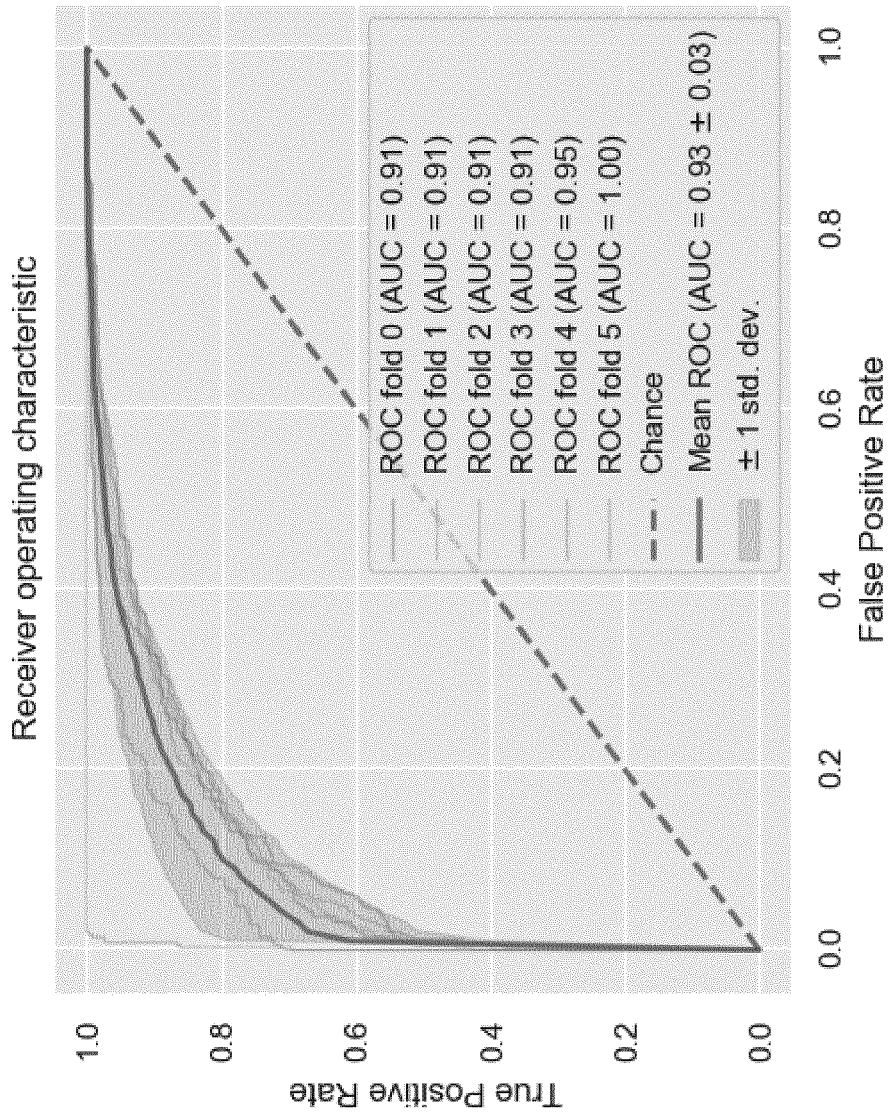
FIG. 11 illustrates a receiving operating characteristic curve, according to some embodiments.

FIG. 11 illustrates a receiving operating characteristic curve, according to some embodiments. The ROC curve shown in FIG. 11 is for the setup shown and described in FIGS. 6-8. As shown in FIG. 11, the mean AUROC is 0.93 indicating that prediction of existence or non-existence of secondary carrier using UL channel impulse response with no dedicated signaling involving UE for secondary carrier prediction.

Figure 12:
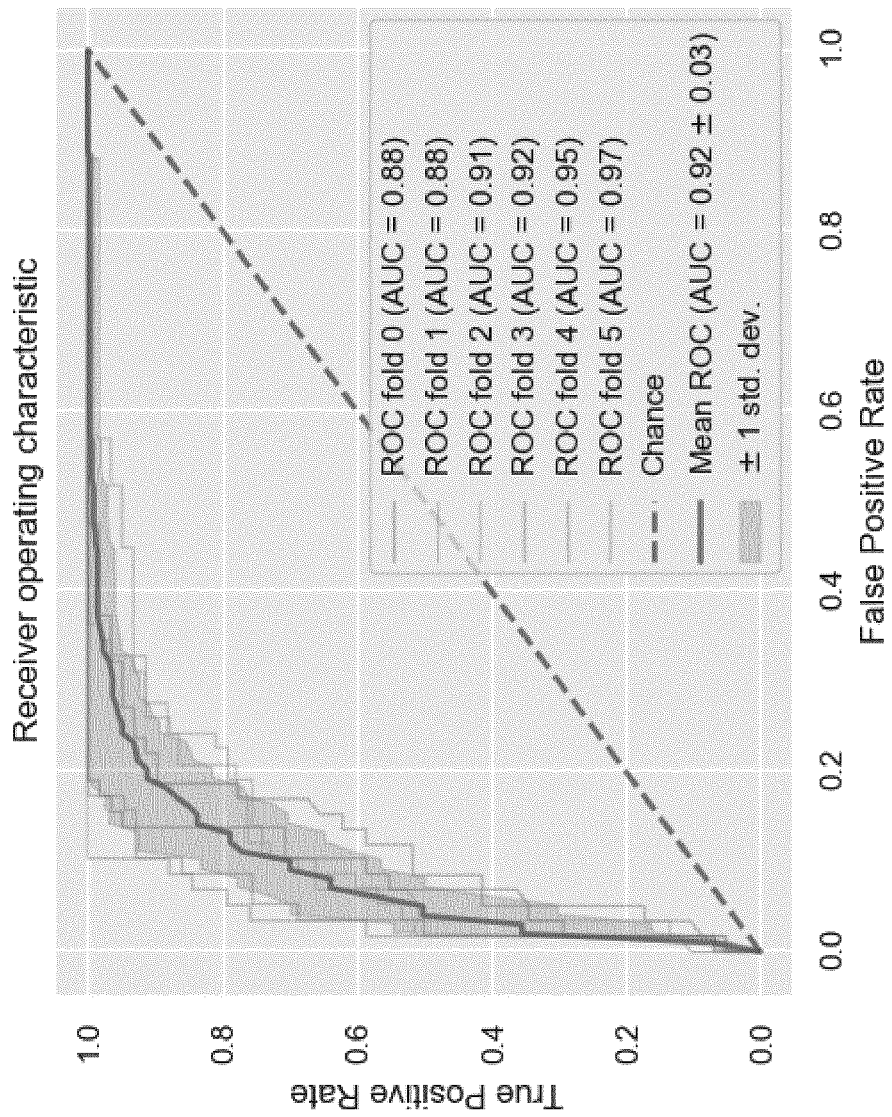
FIG. 12 illustrates a receiving operating characteristic curve, according to some embodiments.

FIG. 12 illustrates a receiving operating characteristic curve, according to some embodiments. The ROC curve shown in FIG. 12 is for the deployment shown and described in connection with FIG. 9.

Figure 13:
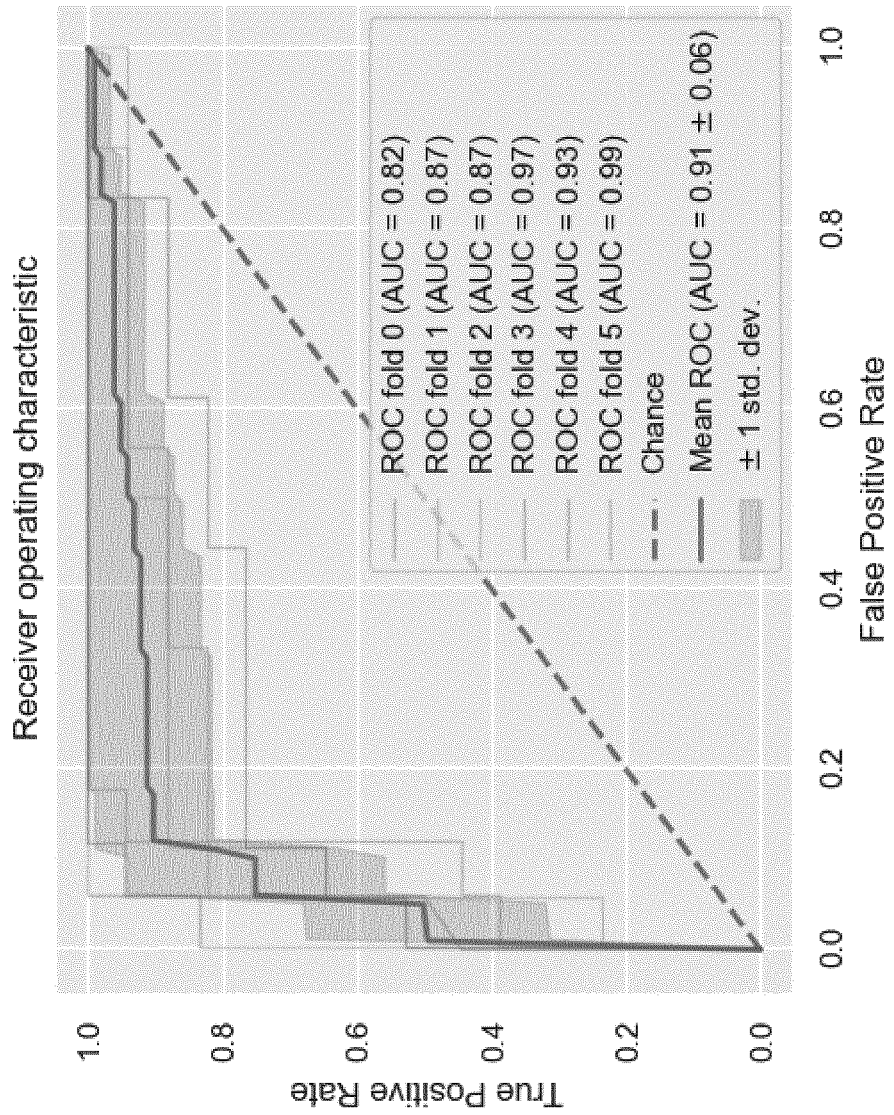
FIG. 13 illustrates a receiving operating characteristic curve, according to some embodiments.

FIG. 13 illustrates a receiving operating characteristic curve, according to some embodiments. The ROC curve shown in FIG. 13 is for the deployment shown and described in connection with FIG. 10.

As shown in FIGS. 12-13, the mean AUROC is close to one, illustrating that simple features derived from UL channel impulse response aid us in secondary carrier prediction.

Figure 14:
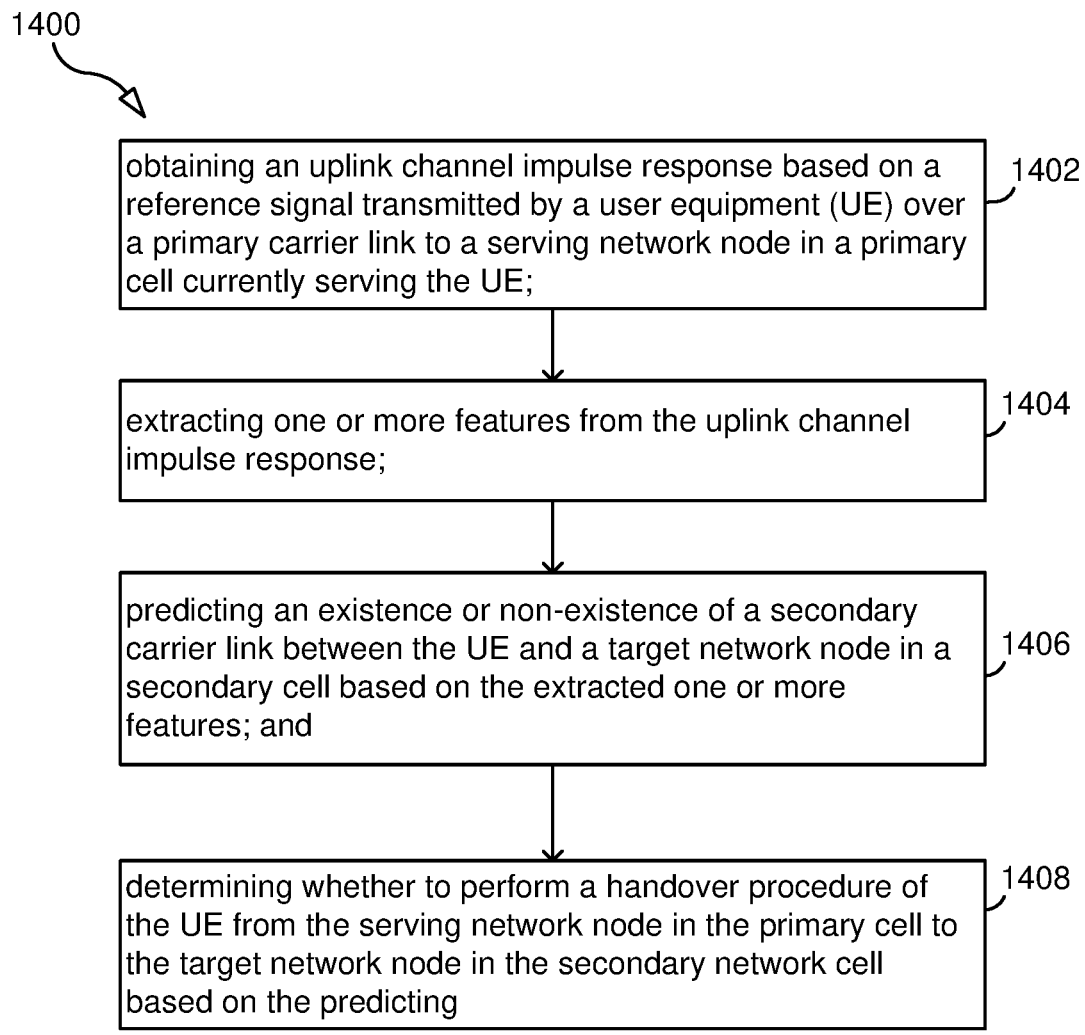
FIG. 14 illustrates a method, according to some embodiments.

FIG. 14 is a method, according to some embodiments. In some embodiments, method 1400 is performed in a radio access network for secondary carrier prediction. In some embodiments, method 1400 is performed by a serving network node (102) in a primary cell currently serving a UE (104). Step 1402 includes obtaining an uplink channel impulse response based on a reference signal transmitted by a user equipment (UE) over a primary carrier link to a serving network node in a primary cell currently serving the UE. Step 1404 includes extracting one or more features from the uplink channel impulse response. Step 1406 includes predicting an existence or non-existence of a secondary carrier link between the UE and a target network node in a secondary cell based on the extracted one or more features. Step 1408 include determining whether to perform a handover procedure of the UE from the serving network node in the primary cell to the target network node in the secondary network cell based on the predicting.

Figure 15:
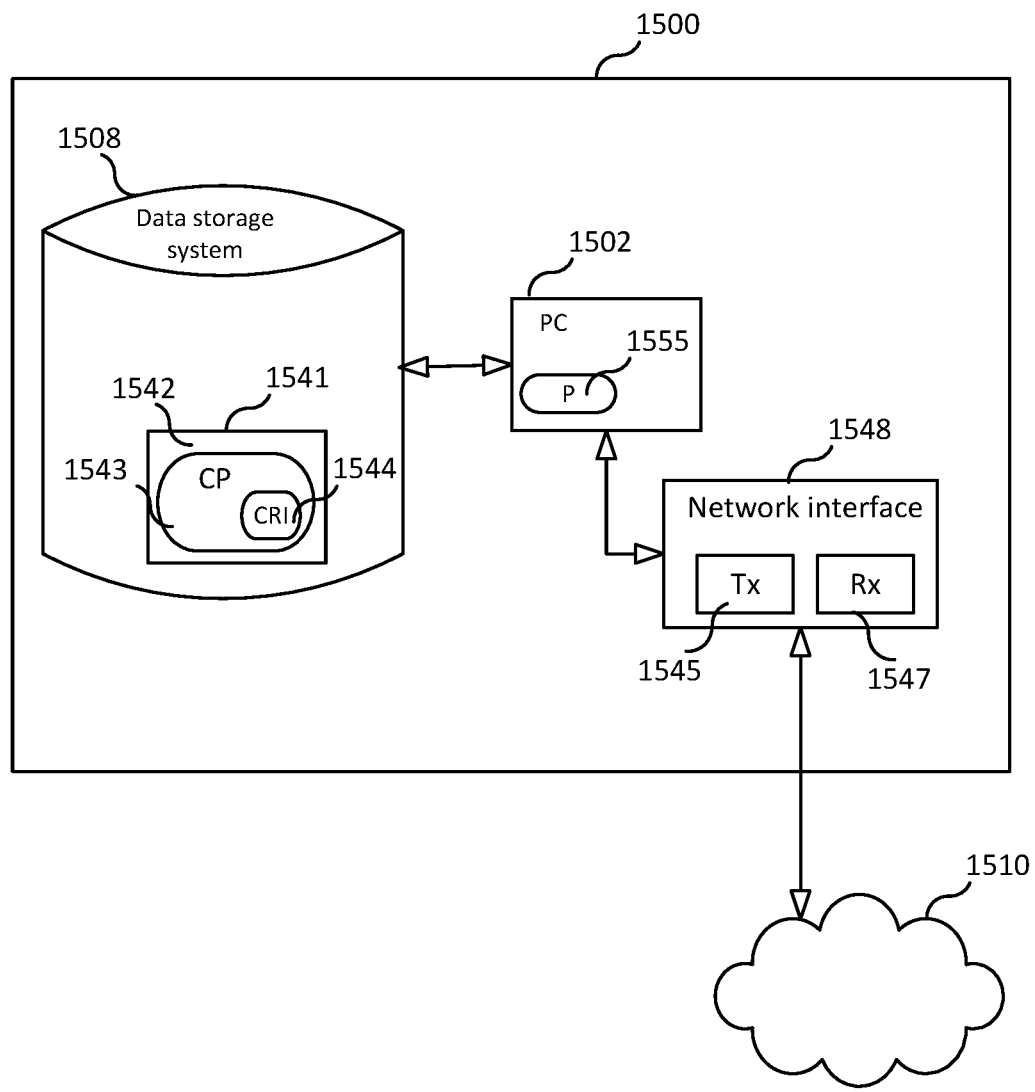
FIG. 15 is a block diagram of an apparatus, according to some embodiments.

FIG. 15 is a block diagram of an apparatus 1500 (e.g., a serving network node 102 in a primary cell), according to some embodiments. As shown in FIG. 15, the apparatus may comprise: processing circuitry (PC) 1502, which may include one or more processors (P) 1555 (e.g., a general purpose microprocessor and/or one or more other processors, such as an application specific integrated circuit (ASIC), field-programmable gate arrays (FPGAs), and the like); a network interface 1548 comprising a transmitter (Tx) 1545 and a receiver (Rx) 1547 for enabling the apparatus to transmit data to and receive data from other nodes connected to a radio access network 1510 (e.g., an Internet Protocol (IP) network or radio access network (RAN)) to which network interface 1548 is connected; and a local storage unit (a.k.a., "data storage system") 1508, which may include one or more non-volatile storage devices and/or one or more volatile storage devices. In embodiments where PC 1502 includes a programmable processor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, magnetic media (e.g., a hard disk), optical media, memory devices (e.g., random access memory, flash memory), and the like. In some embodiments, the CRI 1544 of computer program 1543 is configured such that when executed by PC 1502, the CRI causes the apparatus to perform steps described herein (e.g., steps described herein with reference to the flow charts). In other embodiments, the apparatus may be configured to perform steps described herein without the need for code. That is, for example, PC 1502 may consist merely of one or more ASICs. Hence, the features of the embodiments described herein may be implemented in hardware and/or software.

According to embodiments, computer readable medium (CRM) may also be referred to as carrier.

Figure 16:
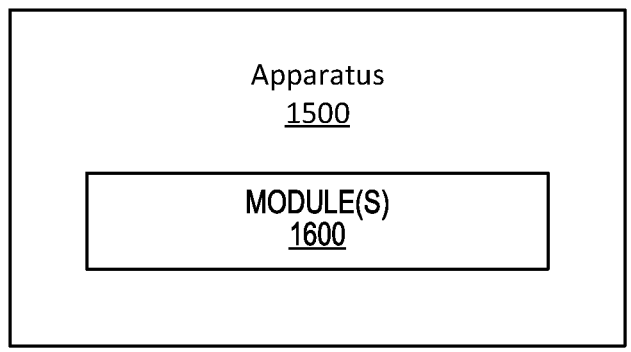
FIG. 16 is a schematic block diagram of an apparatus, according to some embodiments

FIG. 16 is a schematic block diagram of the apparatus 1500 according to some other embodiments. The apparatus 1500 includes one or more modules 1600, each of which is implemented in software. The module(s) 1600 provide the functionality of apparatus 1500 described herein (e.g., the steps herein, e.g., with respect to FIGS. 4 and 14).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer-implemented method performed in a radio access network for secondary carrier prediction, the method comprising:
   obtaining an uplink channel impulse response based on a reference signal transmitted by a user equipment (UE) over a primary carrier link to a serving network node in a primary cell currently serving the UE;
   extracting one or more features from the uplink channel impulse response;
   predicting an existence or non-existence of a secondary carrier link between the UE and a target network node in a secondary cell based on the extracted one or more features; and
   determining whether to perform a handover procedure of the UE from the serving network node in the primary cell to the target network node in the secondary network cell based on the prediction.

2. The method of claim 1, wherein the method is performed by the serving network node in the primary cell currently serving the UE.

3. The method of claim 1, wherein the predicting comprises performing a binary classification using a machine learning process.

4. The method of claim 3, wherein the performing of the binary classification comprises:
   setting a first classification indicating the existence of the secondary carrier link if $G(x_{f_s}) \geq \alpha$; and
   setting a second classification indicating the non-existence of the secondary carrier link if $G(x_{f_s}) < \alpha$, wherein xfs is the extracted one or more features, $X_{f_s} \in R^d$, $G: R^d \rightarrow R$, and
   $\alpha$ is a predefined threshold greater than zero.

5. The method of claim 3, further comprising training the machine learning process, wherein the training comprises:
   collecting an uplink channel impulse response between a transmitter moving within a predefined geographic region and an antenna array,
   recording, at each location of the moving transmitter within the predefined geographic region, a plurality of channel measurements based on the uplink channel impulse response, and
   identifying an existence of a target network node in a respective secondary cell at each of a plurality of secondary cell locations within the predefined geographic region.

6. The method of claim 5, wherein the plurality of channel measurements comprise at least one of: real parts of estimated channel matrices, imaginary parts of estimated channel matrices, and a signal to noise ratio measured at each antenna during channel estimation.

7. The method of claim 3, further comprising training the machine learning process, wherein the training comprises:
   identifying a deployment in a geographic region with a standard propagation environment and having a plurality of primary network nodes and a plurality of secondary target network nodes,
   for a given carrier frequency, collecting an uplink channel impulse response from a transmitter at a location for all links above a predefined threshold, and
   classifying the location of the transmitter as having a secondary link between the transmitter and a secondary target network node based on a strength of the secondary link measured from the uplink channel impulse response.

8. The method of claim 1, wherein the extracted one or more features from the uplink channel impulse response comprise one or more of: energy, minimum value, maximum value, distance of a nearest target network node from the serving network node, Cartesian coordinates of the serving network node, and Cartesian coordinates of the nearest network node.

9. The method of claim 1, wherein the reference signal is an orthogonal frequency-division multiplexing (OFDM) pilot.

10. The method of claim 1, further comprising:
    determining that the UE has an uplink link gain above a predetermined threshold; and
    in response to the determining, recording the uplink channel impulse response at the serving network node in the primary cell.

11. The method of claim 1, wherein the method further comprises:
    initiating a handover procedure of the UE from the serving network node in the primary cell to the target network node in the secondary network cell based on the prediction.

12. A serving network node in a primary cell, the serving network node comprising:
    processing circuitry; and
    memory, the memory containing instructions executable by the processing circuitry, wherein the serving network node is configured to:
    obtain an uplink channel impulse response based on a reference signal transmitted by a user equipment (UE) over a primary carrier link to a serving network node in a primary cell currently serving the UE;
    extract one or more features from the uplink channel impulse response;
    predict an existence or non-existence of a secondary carrier link between the UE and a target network node in a secondary cell based on the extracted one or more features; and
    determine whether to perform a handover procedure of the UE from the serving network node in the primary cell to the target network node in the secondary network cell based on the prediction.

13. A computer program comprising instructions which when executed by processing circuity causes the processing circuity to:
    obtain an uplink channel impulse response based on a reference signal transmitted by a user equipment (UE) over a primary carrier link to a serving network node in a primary cell currently serving the UE;
    extract one or more features from the uplink channel impulse response;

predict an existence or non-existence of a secondary carrier link between the UE and a target network node in a secondary cell based on the extracted one or more features; and determine whether to perform a handover procedure of the UE from the serving network node in the primary cell to the target network node in the secondary network cell based on the prediction.

* * * * *